US012321248B2

(12) United States Patent
Muthiah et al.

(10) Patent No.: US 12,321,248 B2
(45) Date of Patent: Jun. 3, 2025

(54) METHOD AND SYSTEM FOR GENERATING ACTIVITY REPORT OF TESTBENCH COMPONENTS IN A TEST ENVIRONMENT

(71) Applicant: HCL America Inc., Sunnyvale, CA (US)

(72) Inventors: Manickam Muthiah, Shrewsbury, MA (US); Karthikeyan Keelapandal Sundaram, Chennai (IN); Nisha Ravichandran, Hudson, MA (US); Sathish Kumar Krishnamoorthy, Madurai (IN); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 21 days.

(21) Appl. No.: 18/210,082

(22) Filed: Jun. 15, 2023

(65) Prior Publication Data

US 2024/0419565 A1    Dec. 19, 2024

(51) Int. Cl.
*G06F 11/00* (2006.01)
*G06F 11/26* (2006.01)

(52) U.S. Cl.
CPC .................. *G06F 11/261* (2013.01)

(58) Field of Classification Search
CPC ...... G06F 11/261; G06F 11/27; G06F 11/273; G06F 11/267; G06F 11/2733; G06F 11/3065; G06F 11/3086; G06F 11/0766
See application file for complete search history.

(56) References Cited

U.S. PATENT DOCUMENTS

| 6,876,941 | B2 | 4/2005 | Nightingale |
| 9,547,041 | B2 | 1/2017 | Siva et al. |
| 2004/0015739 | A1 | 1/2004 | Heinkel et al. |
| 2016/0142280 | A1 | 5/2016 | Krishnamoorthy et al. |

FOREIGN PATENT DOCUMENTS

JP    2003242194 A  *  8/2003

OTHER PUBLICATIONS

Glenn Freytag, Ravi Shankar; CMI: Component Isolation and Monitoring for System-Level Verification; IEEE Standard Test Access Port and Boundary-Scan Architecture Std.; KluwerAcademic Publishers; Boston, 2002.

* cited by examiner

*Primary Examiner* — Katherine Lin
(74) *Attorney, Agent, or Firm* — Kendal M. Sheets (57) ABSTRACT

A method and system for generating an activity report for testbench components in a test environment is disclosed. In some embodiments, the method includes retrieving a unique ID associated with each of a plurality of registered testbench components. The method further includes selectively configuring the ATU associated with one or more testbench components from the plurality of registered testbench components to generate an activity tracking report at an end of a simulation, based on a user requirement. The method further includes fetching the activity tracking report corresponding to the one or more testbench components based on the associated unique ID. The method further includes generating a summarized activity report corresponding to the one or more testbench components based on the activity tracking report received from the respective ATU. The method further includes rendering at least one of the activity tracking report and the summarized activity report to a user.

13 Claims, 9 Drawing Sheets

Exemplary Activity Tracking Report 702

METHOD AND SYSTEM FOR GENERATING ACTIVITY REPORT OF TESTBENCH COMPONENTS IN A TEST ENVIRONMENT

TECHNICAL FIELD

Generally, the invention relates to pre-silicon functional simulation. More specifically, the invention relates to a method and system for generating activity report of testbench components in a test environment.

BACKGROUND

Simulation testing allows designers to test functionality of a design before it is implemented in hardware. This process involves the use of a test environment (also called testbench environment, verification environment, etc.), which is a collection of software and hardware components that are used to simulate behavior of an electronic system. In order to analyze the system via simulation techniques, multiple simulation testbench components (for example, drivers, monitors, scoreboards, etc.) are used.

In a scenario, where a functional simulation of a Device Under Test (DUT) or System Under Test (SUT) present in the test environment with testbench components is in progress or complete, understanding the entire activity of each testbench component present in the test environment is time consuming. Moreover, in another scenario, when the functional simulation is a long running simulation, then the amount of log files' information that needs to be reviewed for simulation results or failure analysis might be huge. The log files information is reviewed to understand functionality of different testbench components present in the test environment during the functional simulation. Currently, there is no standard mechanism available to track activity of the testbench components present in the test environment and generate activity tracking reports for each simulation to get an understanding of functionality of each testbench component at the end of the functional simulation.

Therefore, there is a need of implementing an efficient and reliable technique for generating an activity report of testbench components in a test environment.

SUMMARY OF INVENTION

In one embodiment, a method for generating an activity report of testbench components in a test environment is disclosed. The method may include retrieving a unique Identity (ID) associated with each of a plurality of registered testbench components present in the test environment. It should be noted that the unique ID associated with each of the plurality of registered testbench components may be transmitted by a corresponding Activity Tracking Unit (ATU) pre-installed in each of the plurality of registered testbench components. The method may further include selectively configuring the ATU associated with one or more testbench components from the plurality of registered testbench components to generate an activity tracking report at an end of a simulation, based on a user requirement. It should be noted that, the activity tracking report may be generated based on an output of a set of activities performed by the one or more testbench components during the simulation. The method may further include fetching from the respective ATU, the activity tracking report corresponding to the one or more testbench components based on the associated unique ID. The method may further include generating a summarized activity report corresponding to the one or more testbench components based on the activity tracking report received from the respective ATU. The method may further include rendering at least one of the activity tracking report and the summarized activity report generated corresponding to the one or more testbench components, to a user.

In another embodiment, a system for generating an activity report of testbench components in a test environment is disclosed. The system includes a processor and a memory communicatively coupled to the processor. The memory may store processor-executable instructions, which, on execution, may cause the processor to retrieve a unique Identity (ID) associated with each of a plurality of registered testbench components present in the test environment. It should be noted that the unique ID associated with each of the plurality of registered testbench components may be transmitted by a corresponding Activity Tracking Unit (ATU) pre-installed in each of the plurality of registered testbench components. The processor-executable instructions, on execution, may further cause the processor to selectively configure the ATU associated with one or more testbench components from the plurality of registered testbench components to generate an activity tracking report at an end of a simulation, based on a user requirement. It should be noted that, the activity tracking report may be generated based on an output of a set of activities performed by the one or more testbench components during the simulation. The processor-executable instructions, on execution, may further cause the processor to fetch from the respective ATU, the activity tracking report corresponding to the one or more testbench components based on the associated unique ID. The processor-executable instructions, on execution, may further cause the processor to generate a summarized activity report corresponding to the one or more testbench components based on the activity tracking report received from the respective ATU. The processor-executable instructions, on execution, may further cause the processor to render at least one of the activity tracking report and the summarized activity report generated corresponding to the one or more testbench components, to a user.

In yet another embodiment, a non-transitory computer-readable medium storing computer-executable instruction for generating an activity report of testbench components in a test environment is disclosed. The stored instructions, when executed by a processor, may cause the processor to perform operations including retrieving a unique Identity (ID) associated with each of a plurality of registered testbench components present in the test environment. It should be noted that the unique ID associated with each of the plurality of registered testbench components may be transmitted by a corresponding Activity Tracking Unit (ATU) pre-installed in each of the plurality of registered testbench components. The operations further include selectively configuring the ATU associated with one or more testbench components from the plurality of registered testbench components to generate an activity tracking report at an end of a simulation, based on a user requirement. It should be noted that, the activity tracking report may be generated based on an output of a set of activities performed by the one or more testbench components during the simulation. The operations further include fetching from the respective ATU, the activity tracking report corresponding to the one or more testbench components based on the associated unique ID. The operations further include generating a summarized activity report corresponding to the one or more testbench components based on the activity tracking report received from the respective ATU. The operations further include rendering at least one of the activity tracking report and the summarized activity report generated corresponding to the one or more testbench components, to a user.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
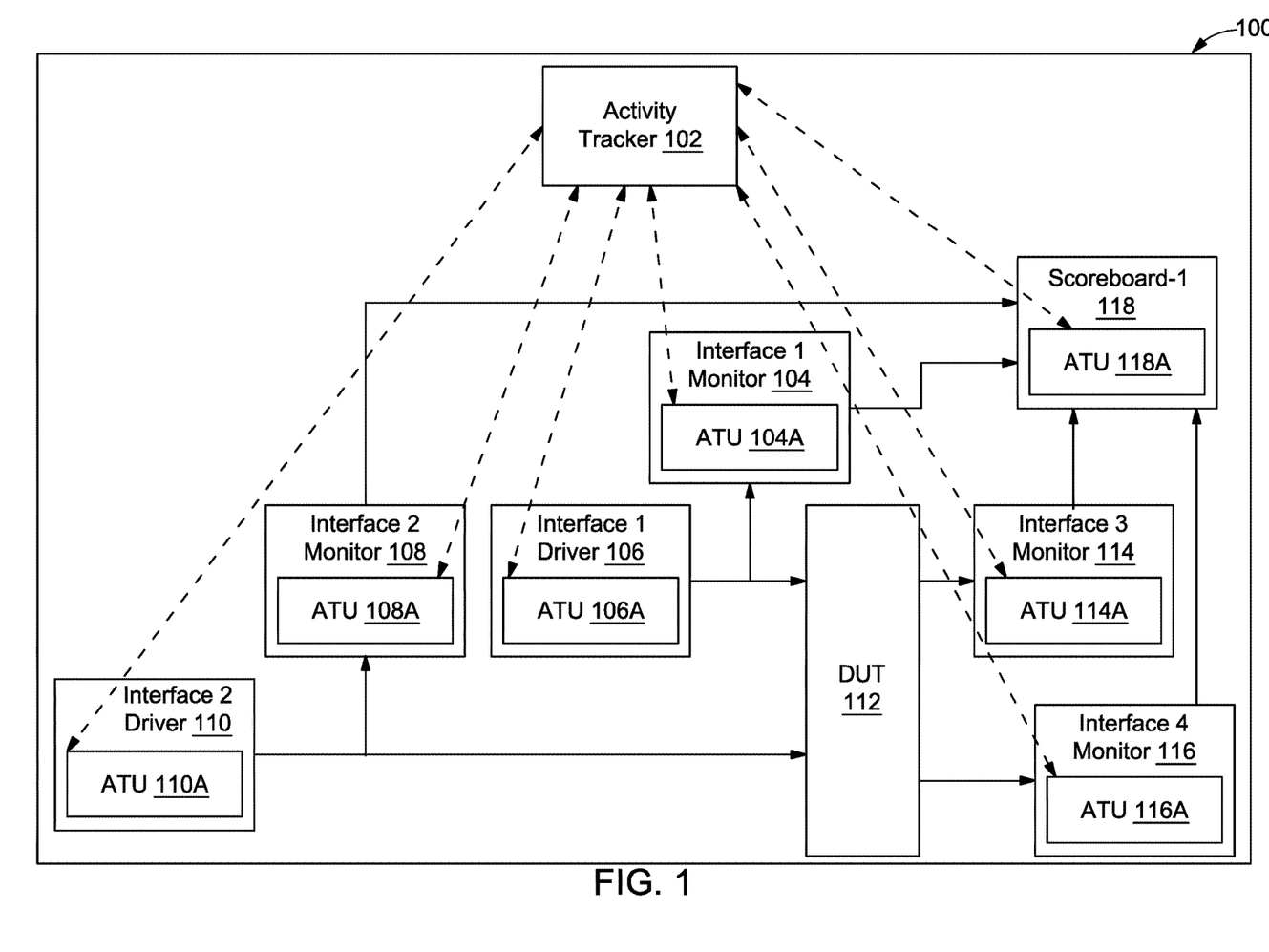
FIG. 1 illustrates a functional diagram of a system for generating an activity report of testbench components in a test environment, in accordance with an embodiment.

Referring now to FIG. 1, a functional block diagram of a system 100 for generating an activity report of testbench components in a test environment is illustrated, in accordance with an embodiment. The system 100 may include an activity tracker 102 configured to track and generate the activity report of the testbench components in the test environment. As depicted via present FIG. 1, the system 100 may include a plurality of testbench components. Examples of the plurality of testbench components may include, but is not limited to, an agent, a sequencer, a driver, a monitor, a scoreboard, a checker, and a coverage collector.

In an embodiment, the plurality of testbench components in an input and output interfaces of a DUT 112 may be represented as 'Interface 1 Monitor 104', 'Interface 1 Driver 106', 'Interface 2 Monitor 108', 'Interface 2 Driver 110', 'Interface 3 Monitor 114', and 'Interface 4 Monitor 116', respectively. Additionally, one of a testbench component from the plurality of testbench components may be represented as a 'scoreboard-1 118'. The system 100 may further include an activity tracking unit (ATU) that is pre-installed within each of the plurality of testbench components. The ATU of each of the plurality of testbench components may be configured for tracking a set of activities corresponding to each of the plurality of testbench components. For example, the testbench component 'Interface 1 Monitor 104' may include an ATU 104A, the testbench component 'Interface 1 Driver 106' may include an ATU 106A, the testbench component 'Interface 2 Monitor 108' may include an ATU 108A, the testbench component 'Interface 2 Driver 110' may include an ATU 110A, the testbench component 'scoreboard-1 118' may include an ATU 118A, the testbench component 'Interface 3 Monitor 114' may include an ATU 114A, and the testbench component 'Interface 4 Monitor 116' may include an ATU 116A.

It should be noted that, when the system 100 of the test environment is implemented (coded/developed), then the ATU within each of the plurality of testbench components may be implemented as a separate class (for example, class atu_component). The testbench component classes such as, driver, monitor classes, etc. may be derived (extended) from the atu_component class. For example, class abc_interface_driver extends atu_component, class abc_interface_monitor extends atu_component, and so on. This may enable easier implementation and consistency.

In order to generate the activity report for the plurality of testbench components, initially, the activity tracker 102 may be configured to receive an ATU message from the ATU pre-installed within each of the plurality of testbench components. Upon receiving the ATU message, the activity tracker 102 may register each of the plurality of testbench components. In an embodiment, the ATU message may include a unique Identity (ID) associated with each of the plurality of testbench components, an object handle to access the corresponding ATU, and an availability status of the corresponding ATU. An exemplary format of the ATU message for registering each of the plurality of testbench components is depicted via FIG. 2.

Once each of the plurality of testbench components is registered, the activity tracker 102 may retrieve the unique ID associated with each of the plurality of registered testbench components present in the test environment. It should be noted that the unique ID associated with each of the plurality of registered testbench components may be transmitted by the corresponding ATU pre-installed in each of the plurality of registered testbench components.

The activity tracker 102 may further selectively configure the ATU associated with one or more testbench components from the plurality of registered testbench components to generate an activity tracking report at an end of a simulation, based on a user requirement. In some embodiments, the activity tracking report may be generated based on an output of the set of activities performed by the one or more testbench components during the simulation. The output associated with the set of activities may include a number of packets processed by each of the plurality of testbench components, content within each of the number of packets, sequence of processing each of the number of packets, idle cycles associated with the number of packets, the number of packets processing frequency of each of the plurality of testbench components, a status information of each of the plurality of testbench components, and start time and end time associated with processing of each of the number of packets.

Further, the activity tracker 102 may fetch the activity tracking report from the respective ATU corresponding to the one or more testbench components based on the associated unique ID. An exemplary representation of the activity tracking report corresponding to a testbench component is depicted and explained in conjunction with FIG. 8. Further, upon receiving the activity tracking report from the respective ATU, the activity tracker 102 may generate a summarized activity report corresponding to the one or more testbench components. In an embodiment, the summarized activity report may be generated based on the activity tracking report received for each of the one or more testbench components from the corresponding ATU. The activity tracking report and the summarized activity report may be one of a textual report, a graphical report, and a tabular report.

The activity tracker 102 may further render at least one of the activity tracking report and the summarized activity report generated corresponding to the one or more testbench components, to a user via a Graphical User Interface (GUI) of an electronic device. Examples of the electronic device may include, but is not limited to, a laptop, a tablet, a desktop, and a smartphone.

In some embodiments, the activity tracking report, and the summarized activity report may be utilized by the user to perform at least one of: identifying one or more issues with respect to one or more of the set of activities performed by a corresponding testbench component of the one or more testbench components, evaluating performance of each of the one or more testbench components during the simulation, and comparing results of at least two simulations. The complete process of generating the activity report for the plurality of registered testbench components in the test environment is explained in greater detail in conjunction with FIGS. 2-10.

Figure 2:
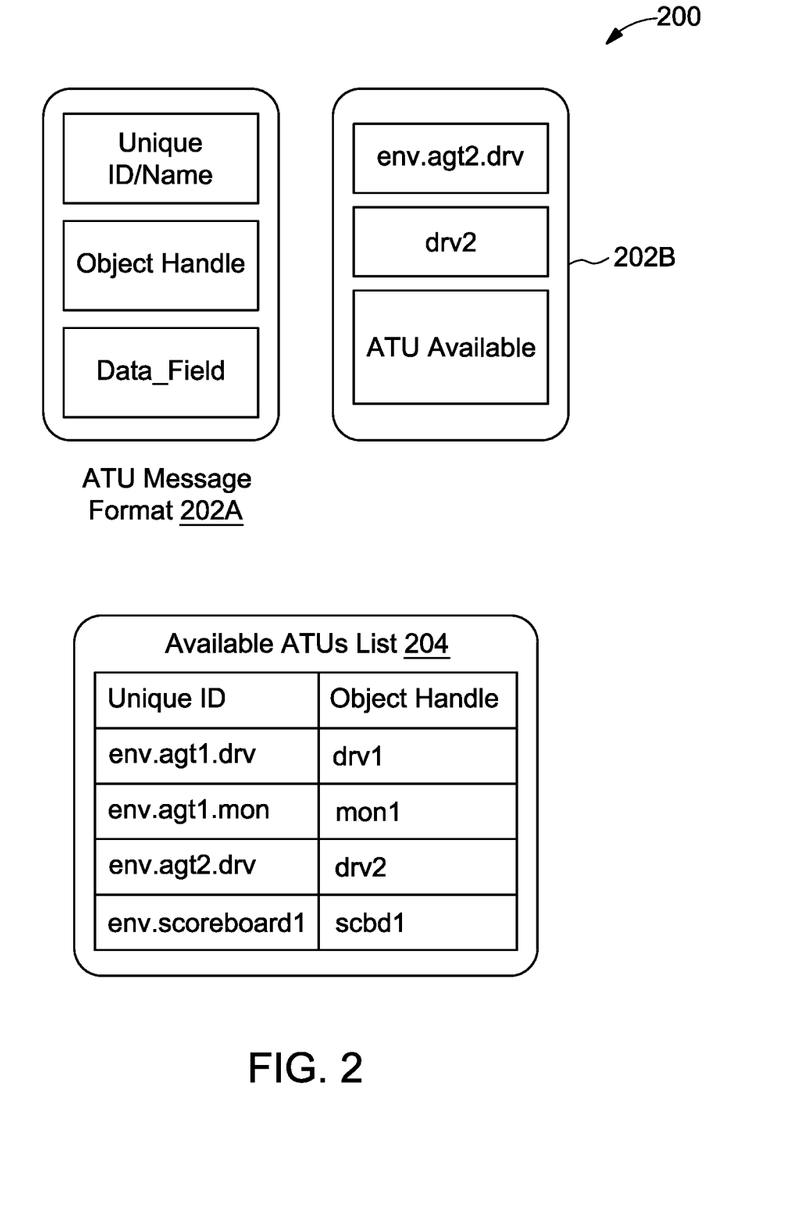
FIG. 2 illustrates an exemplary ATU message format, an ATU message, and an available ATUs list, in accordance with an embodiment.

Referring now to FIG. 2, an exemplary ATU message format 202A, an ATU message 202B, and an available ATUs list 204 are illustrated, in accordance with an embodiment. As mentioned earlier in reference to FIG. 1, in order to register each of the plurality of testbench components, the activity tracker 102 may receive the ATU message from the corresponding ATU at start of the simulation. As depicted via present FIG. 2, the ATU message format 202A may include the unique ID associated with each of the plurality of testbench components (for example, a unique name or a hierarchical name of the testbench component), the object handle to access the corresponding ATU, and a Data_Field to represent the availability status (for example, 'ATU Available' message in case of the ATU availability) of the corresponding ATU. As will be appreciated, in an object-oriented programming language, the object handle may be an address with which the respective ATU may be accessed.

By way of an example, whenever the ATU of a testbench component sends the ATU message using the ATU message format 202A to the activity tracker 102 in order to register the respective testbench component, the activity tracker 102 may identify a source of the ATU message 202B using the unique ID associated with the respective testbench component. For example, in order to register the testbench component, e.g., 'Interface 2 Driver 110', the activity tracker 102 may receive the ATU message 202B from the ATU 110A of the 'Interface 2 Driver 110'. Further as depicted via the present FIG. 2, the ATU message 202B received by the activity tracker 102 from the ATU 110A of 'Interface 2 Driver 110' may include the unique ID associated with the 'Interface 2 Driver 110', in a format 'env.agt2.drv'. In addition to the unique ID, the ATU message 202B received by the activity tracker 102 may include the object handle in a format 'drv2' to access the ATU 110A. Further in addition to the unique ID and the object handle, the ATU message 202B may include the 'ATU Available' message in case of availability of the ATU 110A. As will be appreciated, each of the plurality of testbench components may be registered with the activity tracker 102 in a similar way as the testbench component 'Interface 2 Driver 110' is registered.

Once each of the plurality of testbench components present in the test environment are registered, then the activity tracker 102 may store the received unique ID and the object handle associated with each of the plurality of testbench components in a list called the "Available ATUs List 204", as depicted in the present FIG. 2. Further, the activity tracker 102 may retrieve the unique ID associated with each of the plurality of registered testbench components present in the test environment.

Using the unique ID and the object handle of the available ATU, the activity tracker 102 may selectively configure the ATU associated with one or more testbench components from the plurality of registered testbench components to generate the activity tracking report at the end of the simulation, based on a user requirement.

Figure 7:
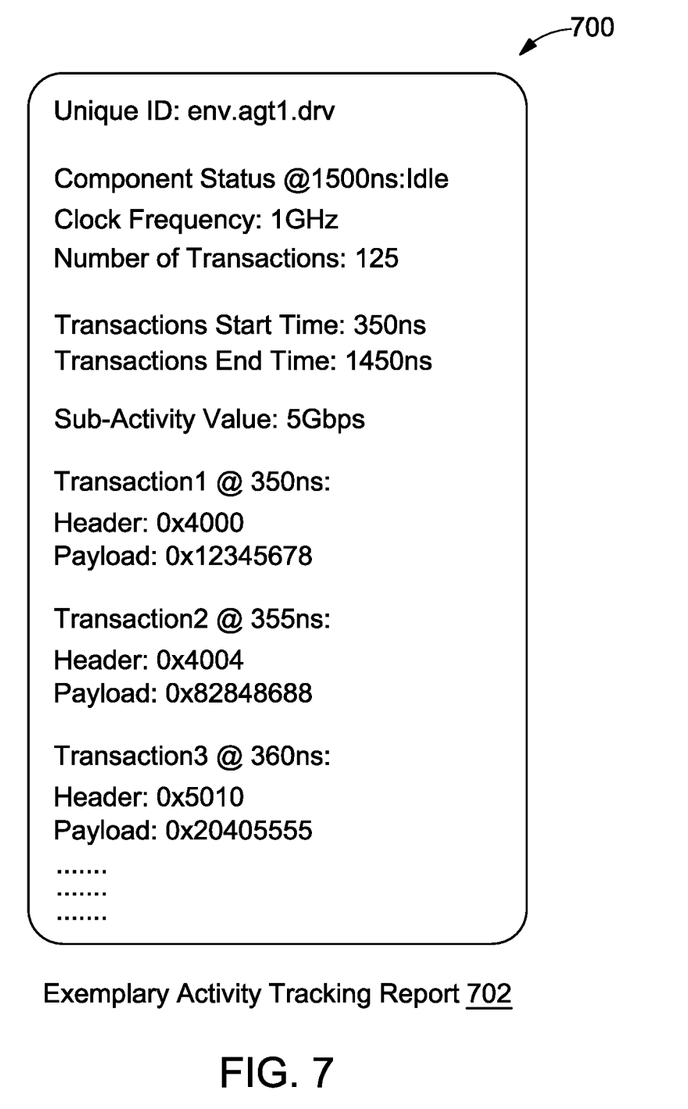
FIG. 7 represents a GUI depicting an exemplary activity tracking report corresponding to a testbench component from a plurality of registered testbench components in a textual format, in accordance with an exemplary embodiment.

In an embodiment, the ATU of the one or more testbench components may generate the activity tracking report based on the set of activities performed by each of the one or more testbench components. In other words, the activity tracking report may be generated by the corresponding ATU based on an output of the set of activities performed by the one or more testbench components during the simulation. In an embodiment, the output of the set of activities may include the number of packets processed by each of the one or more testbench components, content within each of the number of packets, sequence of processing each of the number of packets, idle cycles associated with the number of packets, the number of packets processing frequency of each of the one or more testbench components, the status information of each of the one or more testbench components, and start time and end time associated with processing of each of the number of packets. The activity report generated corresponding to a testbench component from the plurality of registered testbench components in a textual format is illustrated in FIG. 7.

Figure 3:
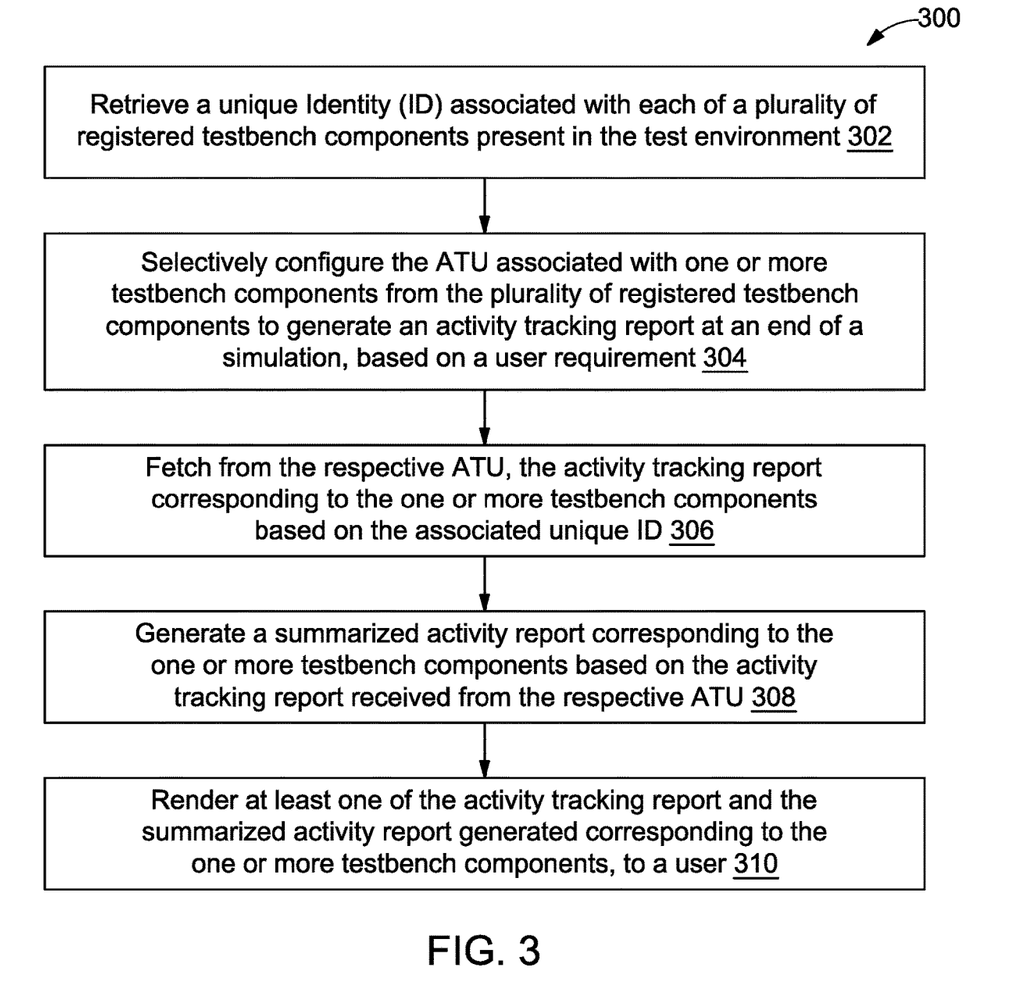
FIG. 3 is a flowchart of a method for generating an activity report of testbench components in a test environment, in accordance with an embodiment.

Referring now to FIG. 3, a flowchart of a method 300 for generating an activity report of testbench components in a test environment is illustrated, in accordance with an embodiment. It should be noted that the steps 302-310 of the method 300 may be performed by the activity tracker 102 of the system 100. At step 302, a unique ID associated with each of a plurality of registered testbench components present in the test environment may be retrieved. In an embodiment, the unique ID associated with each of the plurality of registered testbench components may be transmitted by a corresponding ATU pre-installed in each of the plurality of registered testbench components. Examples of the plurality of testbench components may include, but are not limited to an agent, a sequencer, a driver, a monitor, a scoreboard, a checker, and a coverage collector.

Upon retrieving the unique ID, at step 304, the ATU associated with one or more testbench components may be selectively configured from the plurality of registered testbench components to generate an activity tracking report at an end of a simulation, based on a user requirement. It should be noted that the activity tracking report may be generated based on an output associated with a set of activities performed by the one or more testbench components during the simulation. A method of selectively configuring the ATU associated with a testbench component of one or more testbench components is further explained in detail in reference to FIG. 5.

In an embodiment, the output associated with the set of activities may include a number of packets processed by each of the plurality of testbench components, content within each of the number of packets, sequence of processing each of the number of packets, idle cycles associated with the number of packets, the number of packets processing frequency of each of the plurality of testbench components, a status information of each of the plurality of testbench components, and start time and end time associated with processing of each of the number of packets.

Once the activity tracking report is generated, at step 306, the activity tracking report corresponding to the one or more testbench components may be fetched from the respective ATU. In an embodiment, the activity tracking report may be fetched from the respective ATU based on the unique ID associated with each of the one or more testbench components. Further, at step 308, a summarized activity report corresponding to the one or more testbench components may be generated. The summarized activity tracking report may be generated based on the activity tracking report received for each of the one or more testbench components from the corresponding ATU.

Further, at step 310, at least one of the activity tracking report, and the summarized activity report generated corresponding to the one or more testbench components may be rendered to a user. In some embodiments, the activity tracking report, and the summarized activity report may be utilized by the user to perform one or more computations. A method of utilizing the activity tracking report, and the summarized activity report is explained in detail in conjunction with FIG. 6.

Figure 4:
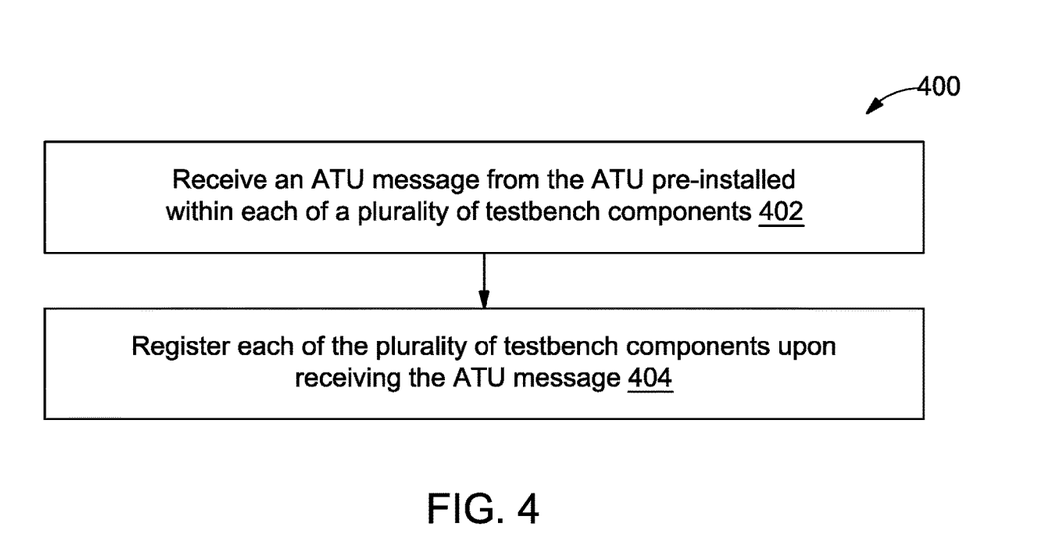
FIG. 4 is a flowchart of a method for registering each of a plurality of testbench components, in accordance with an embodiment.

Referring now to FIG. 4, a flowchart of a method 400 for registering each of a plurality of testbench components is illustrated, in accordance with an embodiment. As mentioned in reference to FIG. 3, in order to generate the activity report for each the plurality of testbench components, initially, each of the plurality of testbench components may be registered with the activity tracker 102.

Further, in order to register each of the plurality of testbench components, at step 402, an ATU message may be received from the ATU pre-installed within each of the plurality of testbench components. The ATU message received from the corresponding ATU may include the unique ID associated with each of the plurality of testbench components, the object handle to access the corresponding ATU, and the availability status of the corresponding ATU. With reference to FIG. 2, the ATU message (for example: the ATU message 202B) may be received from the ATU of each of the plurality of testbench components in the ATU message format 202A. Further, at step 404, upon receiving the ATU message, each of the plurality of testbench components may be registered. With reference to FIG. 2, once each of the plurality of testbench components are registered with the activity tracker 102, then the activity tracker 102 may store the unique ID and the object handle associated with each of the plurality of testbench components in a form of the available ATUs list 204.

Figure 5:
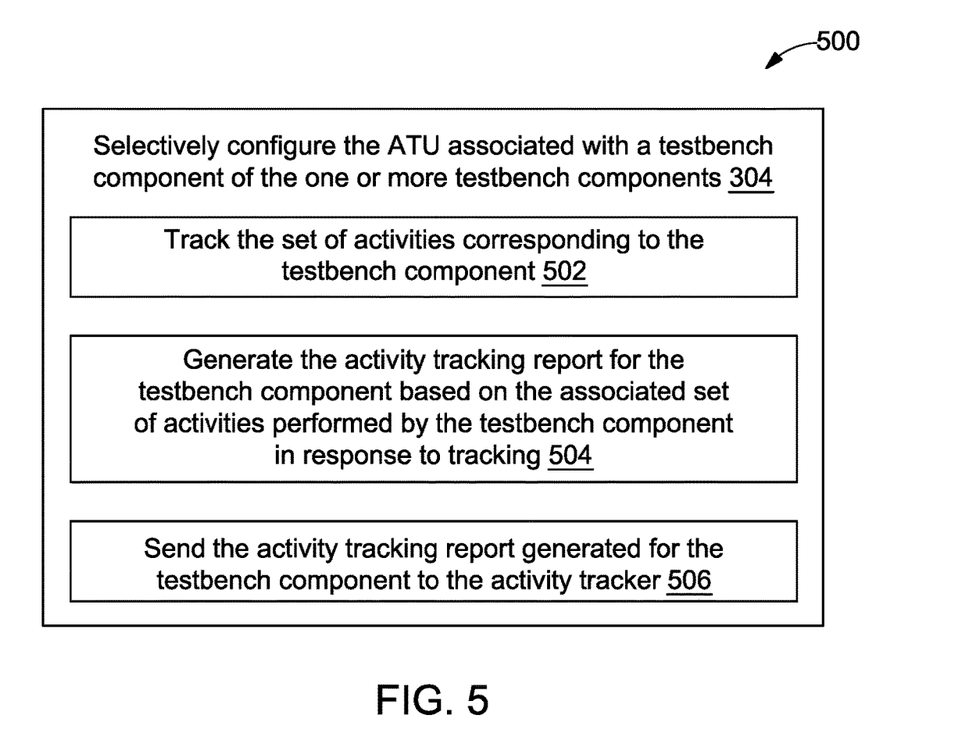
FIG. 5 is a flowchart of a method for selectively configuring an ATU associated with a testbench component of one or more testbench components, in accordance with an embodiment.

Referring now to FIG. 5, a flowchart of a method 500 for selectively configuring an ATU associated with a testbench component of one or more testbench components is illustrated, in accordance with an embodiment. It should be noted that the steps 502-506 of the method 500 may be performed by the respective ATU of each of the plurality of registered testbench components as depicted via the system 100. As mentioned at step 304 of FIG. 3, the ATU associated with the one or more testbench components from the plurality of registered testbench components may be selectively configured to generate the activity tracking report at the end of the simulation.

Therefore, in reference to the present FIG. 5, in order to selectively configure the ATU to generate the activity tracking report, at step 502, the set of activities corresponding to the associated testbench component may be tracked. As will be appreciated, in an embodiment, the ATU pre-installed within the testbench component may be configured by the activity tracker 102 to track the set of activities performed by the testbench component. Once the ATU pre-installed within the testbench component is configured, the ATU may track the respective testbench component while the respective testbench component will be performing each of the set of activities.

Further, at step 504, the activity tracking report may be generated for the testbench component. In an embodiment, the activity tracking report may be generated based on the associated set of activities performed by the testbench component in response to tracking. It should be noted that the activity tracking report may be generated at the end of the simulation. Furthermore, at step 506, the activity tracking report generated for the testbench component may be sent to the activity tracker 102 by the respective ATU.

In some embodiments, based on the activity tracking report received from the respective ATU, the activity tracker 102 may generate the summarized activity report corresponding to the one or more testbench components. In some embodiments, the activity tracking report, and the summarized activity report may be utilized to perform one or more computations. This is further explained in conjunction with FIG. 6.

Figure 6:
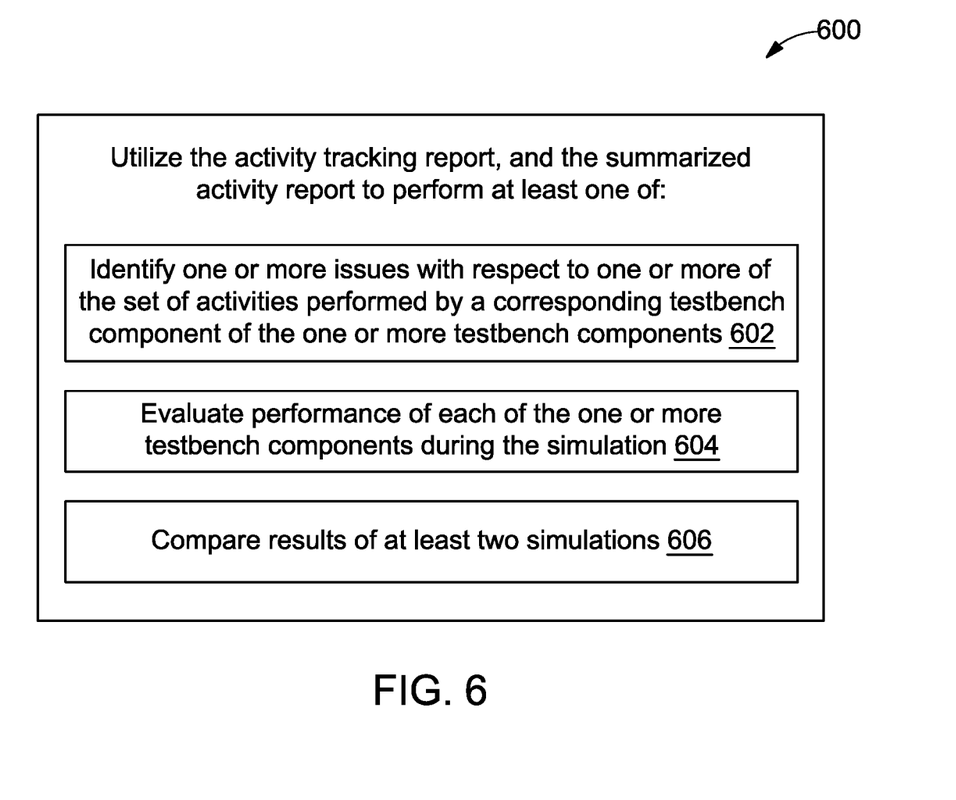
FIG. 6 is a flowchart of a method for utilizing an activity tracking report, and a summarized activity report to perform one or more computations, in accordance with an embodiment.

Referring now to FIG. 6, a flowchart of a method 600 for utilizing an activity tracking report and a summarized activity report to perform one or more computations is illustrated, in accordance with an embodiment. Once the activity tracking report and the summarized activity report are generated, these reports may further be utilized to perform one or more computations. For example, at step 602 the activity tracking report and the summarized activity report may be utilized by the user to identify one or more issues with respect to one or more of the set of activities performed by a corresponding testbench component of the one or more testbench components.

Further, at step 604, the activity tracking report and the summarized activity report may be utilized by the user to evaluate performance of each of the one or more testbench components during the simulation. By way of an example, the ATU (e.g., the ATU 110A) pre-installed in one of a driver testbench component (e.g., the 'Interface 2 Driver 110') may identify if that driver testbench component from the plurality of testbench components is stuck or hung. In order to identify that the driver testbench component is stuck or hung, the ATU pre-installed in the driver testbench component may keep tracking progress of the activity being performed by the driver testbench component. Further, based on the tracking, when the ATU does not detect any forward progress in the driver testbench component (for example, the driver testbench component waiting indefinitely for credits before it may drive a transaction into the DUT 112) for a specified period of time, then the ATU may decide that the driver testbench component is stuck or hung. In such condition, the corresponding ATU may report this issue via the activity tracking report to the activity tracker 102. Further, based on the issue identified, the activity tracker 102 may take an appropriate action (for example, terminating the simulation). In some embodiment, the activity tracker 102 may render the issue in form of the activity tracking report, to the user for user review.

By way of another example, the ATU (e.g., the ATU 118A) pre-installed in a scoreboard testbench component (e.g., the 'Scoreboard-1 118') may be configured by the activity tracker 102 to track the set of activities of the scoreboard testbench component, during the simulation. Further, based on the tracking, upon identifying that no check has been performed by the scoreboard testbench component for the simulation until the end of the simulation, then the ATU of the scoreboard testbench component will report this issue to the activity tracker 102. In an embodiment, the ATU of the scoreboard testbench component may report this issue to the activity tracker 102 in a form of the activity tracking report. Further, the activity tracker 102 may render the activity tracking report received from the scoreboard testbench component to the user for user review.

By way of another example, the ATU (e.g., the ATU 104A) pre-installed in one of a monitor testbench component (e.g., the 'Interface 1 Monitor 104') may be configured to check one or more activities performed by the monitor testbench component (referred as 'Activity Check') against an expectation (i.e., expected activity value) at the end of the simulation. In other words, the ATU of the monitor testbench component may be configured to compare an actual activity value generated based on an activity performed by the monitor testbench component with the expected activity value defined by the user for the activity. A result of the 'Activity Check' performed by the ATU of the monitor testbench component may be reported to the activity tracker 102 via the activity tracking report.

Further, the activity tracker 102 may collect results of 'Activity Check', i.e., the activity tracking report from the corresponding ATU of each of the plurality of registered testbench component and may generate an Activity Check results summary, i.e., the summarized activity report. Further, the activity tracker 102 may render the generated summarized activity report to the user for user review at the end of the simulation.

By way of another example, the activity tracker 102 may notify the user via the summarized activity report, when the simulation runs beyond a certain time limit (in terms of simulation time or wall clock time) after the activity tracker 102 may have detected that each of the plurality of registered testbench components that includes the ATU are idle (based on the activity tracking report received with idle status information from the respective ATU). This notification may be useful for the user, as the user might not expect the simulation to run for an extended period after each of the plurality of registered testbench components are idle.

Furthermore, at step 606, the activity tracking report and the summarized activity report may be utilized by the user to compare results of at least two simulations. By way of an example, using the activity tracking report received from the ATU (e.g., the ATU 106A) of a testbench component (e.g., the Interface 1 Driver 106) for first simulation (also referred as the first simulation run) may be compared with the activity tracking report received from the same ATU, i.e., the ATU 106A of the same testbench component, i.e., the Interface 1 Driver 106 for second simulation. As will be appreciated, the comparison may be done either by the activity tracker 102 automatically or by the user. Further, based on the comparison, a difference in performance of the testbench component, i.e., the Interface 1 Driver 106 between the two simulation runs may be identified.

By way of another example, the summarized activity report generated by the activity tracker 102 for first simulation may be compared with the summarized activity report generated by the activity tracker 102 for second simulation. As will be appreciated, the comparison may be done either by the activity tracker 102 automatically or by the user. Further, based on the comparison, the user may be able to grade these simulations (i.e., the first simulation and the second simulation).

In some embodiments, the activity tracker 102 may generate a functional performance value for the simulation. The functional performance value may be generated by the activity tracker 102 by using the actual activity value and a simulation time consumed for the simulation (i.e., the functional performance value=actual activity value/the simulation time). The functional performance value generated as mentioned above may be a useful metric for comparing two different simulations. For example, the functional performance value generated for the simulation run on a specific design Register-Transfer Level (RTL) version may be compared against the functional performance value generated for the same simulation run on a different version of the respective design RTL to identify or understand performance difference between the at least two simulations (also referred as simulation runs).

Referring now to FIG. 7, a GUI 700 depicting an exemplary activity tracking report 702 corresponding to a testbench component from a plurality of registered testbench components in a textual format is represented, in accordance with an exemplary embodiment. In an embodiment, the ATU pre-installed in each of the plurality of registered testbench components may generate a report called the activity tracking report based on the output associated with the set of activities performed by the one or more testbench components, at the end of the simulation. The output associated with the set of activities may include a number of packets processed by each of the plurality of registered testbench components, content within each of the number of packets, sequence of processing each of the number of packets, idle cycles associated with the number of packets, the number of packets processing frequency of each of the plurality of registered testbench components, a status information of each of the plurality of registered testbench components, and start time and end time associated with processing of each of the number of packets.

The activity tracking report generated by the ATU may be stored in a separate log file for each of the plurality of registered testbench components. Further, the ATU may send the generated activity tracking report to the activity tracker 102. The activity tracker 102 may render the activity tracking report received from the ATU of the one or more testbench components to the user for user review. The exemplary activity tracking report 702 corresponding to the testbench component 'Interface 1 Driver 106' having the unique ID 'env.agt1.drv' is depicted in the present FIG. 7 via the GUI 700. As depicted via the GUI 700, the exemplary activity tracking report 702 may include result (i.e., information) of the set of activities performed by the testbench component 'Interface 1 Driver 106' that was tracked by the ATU 106A. Further, the exemplary activity tracking report 702 may further be rendered to the user as depicted via the GUI 700.

Figure 8:
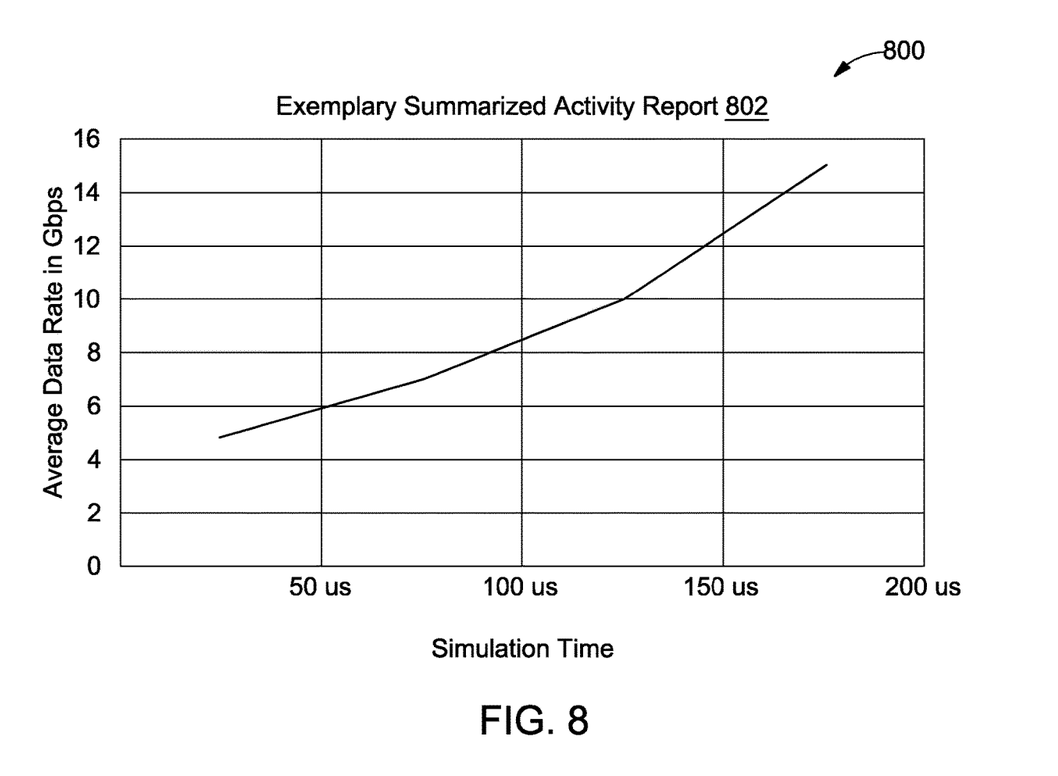
FIG. 8-FIG. 10 represent GUIs depicting an exemplary summarized activity report corresponding to one or more testbench components from a plurality of registered testbench components in a graphical format, in accordance with an exemplary embodiment.
Figure 9:
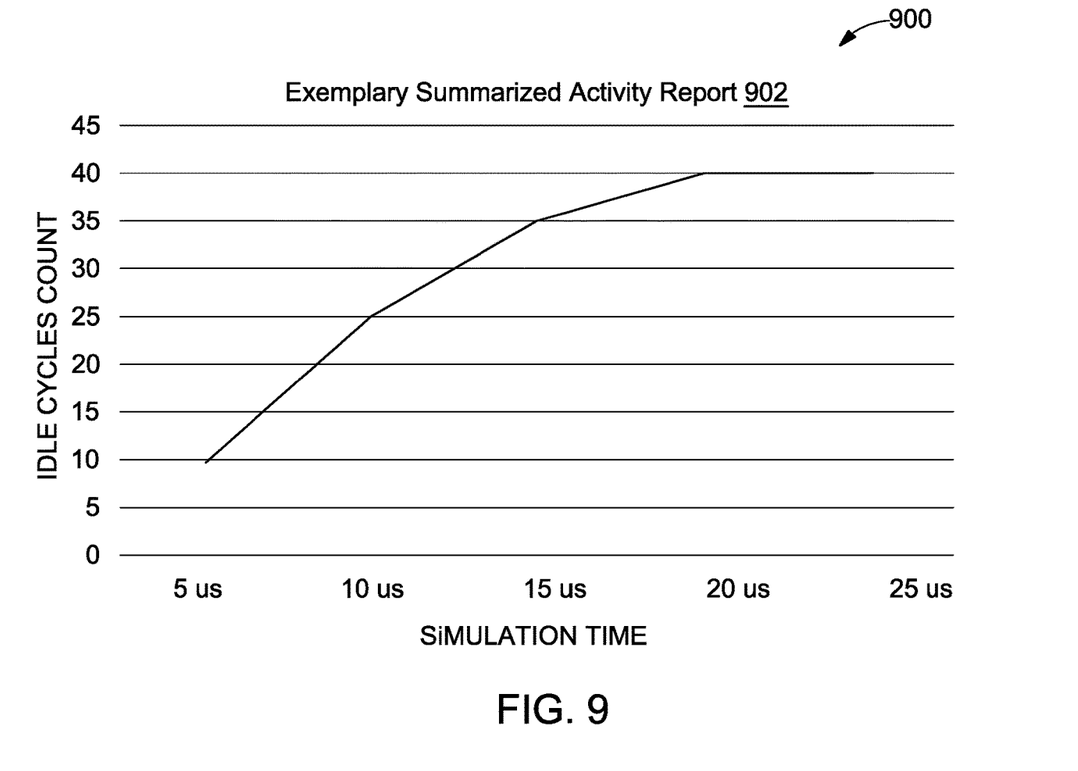
Figure 10:
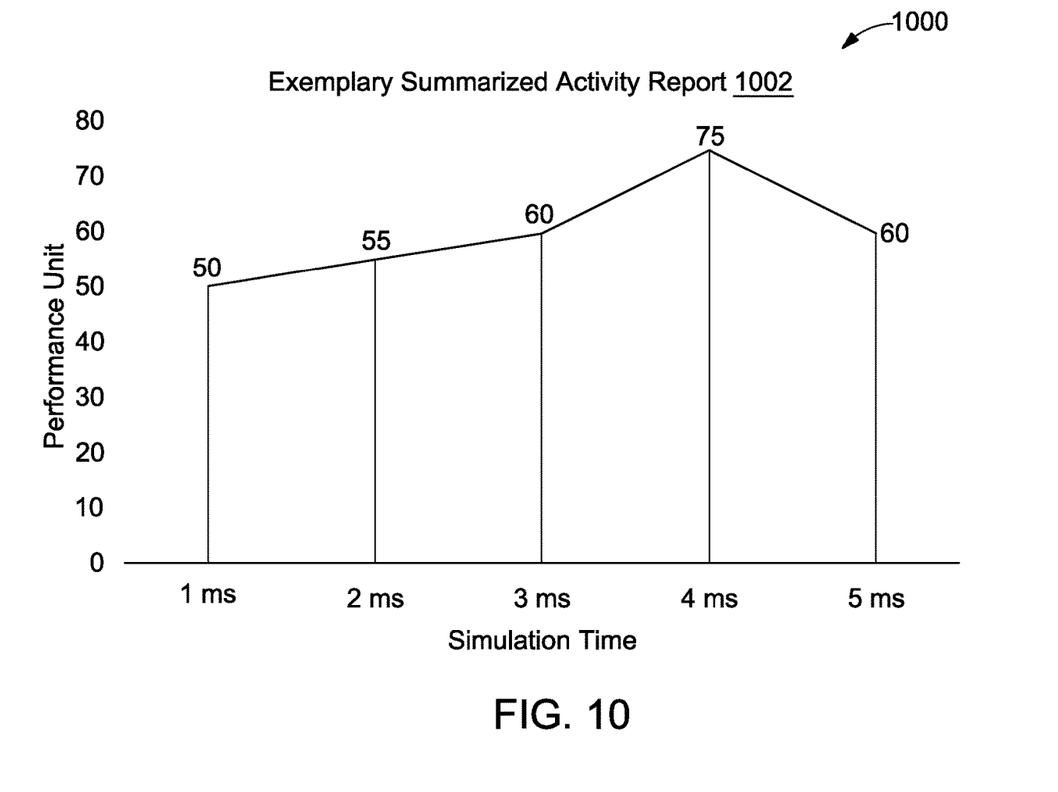

Referring now to FIG. 8, FIG. 9, and FIG. 10, represent GUIs depicting an exemplary summarized activity report corresponding to one or more testbench components from a plurality of testbench components in a graphical format, in accordance with an exemplary embodiment. Once the activity tracking report generated by the ATU of each of the one or more components is received by the activity tracker 102, then the activity tracker 102 may generate the summarized activity report corresponding to the one or more testbench components based on the activity tracking report received from the respective ATU. The summarized activity report generated may be stored in a separate log file for each of the one or more testbench components. Further, the generated summarized activity report may be rendered to the user for user review.

A graphical representation of exemplary summarized activity reports corresponding to the one or more testbench components is depicted in FIG. 8, FIG. 9, and FIG. 10 via GUI 800, GUI 900, and GUI 1000, respectively. Each of the exemplary summarized activity reports depicting a set of tracked activities associated with the one or more testbench components over simulation timeline, at the end of the simulation. For example, an exemplary summarized activity report 802 depicting change in average data rate (in Gbps) over simulation time (in μs) is represented via the GUI 800. In an embodiment, the simulation time may correspond to time consumed by each of the one or more testbench components to perform a corresponding set of activities during the simulation. An x-axis of the exemplary summarized activity report 802 represents the simulation time of the simulation. Whereas the y-axis of the exemplary summarized activity report 802 represents the average data rate with respect to the one or more testbench components over the simulation time.

Further, an exemplary summarized activity report 902 depicting number of idle cycles count over the simulation time is represented via the GUI 900. An x-axis of the exemplary summarized activity report 902 represents the simulation time of the simulation. Whereas the y-axis of the exemplary summarized activity report 902 represents the idle cycles count of the one or more testbench components over the simulation time. Moreover, an exemplary summarized activity report 1002 depicting a performance of the one or more testbench components over the simulation time is represented via the GUI 1000. An x-axis of the exemplary summarized activity report 1002 represents the simulation time of the simulation. Whereas the y-axis of the exemplary summarized activity report 1002 represents the performance of the one or more testbench components during the simulation. These exemplary summarized activity reports (802, 902, and 1002) generated by the activity tracker 102 may be rendered to the user for user review. Further, the user may use these exemplary summarized activity reports (802, 902, and 1002) to understand the activity or performance of the one or more testbench components, such as, driver, monitor, etc.

Various embodiments provide method and system for generating an activity report of testbench components in a test environment. The disclosed method and system may retrieve a unique Identity (ID) associated with each of a plurality of registered testbench components present in the test environment. The unique ID associated with each of the plurality of testbench components may be transmitted by a corresponding Activity Tracking Unit (ATU) pre-installed in each of the plurality of registered testbench components. Further, the disclosed method and system may selectively configure the ATU associated with one or more testbench components from the plurality of registered testbench components to generate an activity tracking report at an end of a simulation, based on a user requirement. The activity tracking report may be generated by the ATU based on an output associated with a set of activities performed by the one or more testbench components during the simulation. Further, the disclosed method and system may fetch from the respective ATU, the activity tracking report corresponding to the one or more testbench components based on the associated unique ID. Further, the disclosed method and system may generate a summarized activity report corresponding to the one or more testbench components based on the activity tracking report received from the respective ATU. Thereafter, the disclosed method and system may render at least one of the activity tracking report, and the summarized activity report generated corresponding to the one or more testbench components, to a user.

The disclosed method and system may provide some advantages like, the disclosed method and the system may be methodology independent and hence may be used across any of existing industry standard verification methodologies. Further, the disclosed method and the system may track activities of a plurality of testbench components present in a test environment. In addition, the disclosed method and the system may install an ATU in each of the plurality of testbench components for tracking activities performed by each testbench component during the simulation. Moreover, the disclosed method and the system may render the activity tracking report and the summarized activity report generated corresponding to the one or more testbench components to the user for user review. The activity tracking report and the summarized activity report may enable the user to quickly understand what happened in the simulation. In other words, the activity tracking report and the summarized activity report may enable the user to do simulation results analysis or simulation failure analysis. This may improve an efficiency of the simulation results analysis and the simulation failures analysis as the ramp-up time required to understand the test environment or testbench components' activity for each simulation before doing the results/failure analysis may be cut down significantly with the help of the disclosed method and system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating an activity report for testbench components in a test environment, the method comprising:
    receiving, by an activity tracker, an Activity Tracking Unit (ATU) message from an ATU pre-installed within each of a plurality of testbench components;
    registering, by the activity tracker, each of the plurality of testbench components upon receiving the ATU message;
    retrieving, by the activity tracker, a unique Identity (ID) associated with each of the plurality of registered testbench components present in the test environment, wherein the unique ID associated with each of the plurality of registered testbench components is transmitted by the corresponding ATU pre-installed in each of the plurality of registered testbench components;
    selectively configuring, by the activity tracker, the ATU associated with one or more testbench components from the plurality of registered testbench components to generate an activity tracking report at an end of a simulation, based on a user requirement, wherein the activity tracking report is generated based on an output of a set of activities performed by the one or more testbench components during the simulation;
    fetching from the respective ATU, by the activity tracker, the activity tracking report corresponding to the one or more testbench components based on the associated unique ID;
    generating, by the activity tracker, a summarized activity report corresponding to the one or more testbench components based on the activity tracking report received from the respective ATU; and
    rendering, by the activity tracker via a Graphical User Interface (GUI), at least one of the activity tracking report, and the summarized activity report generated corresponding to the one or more testbench components, to a user.

2. The method of claim 1, wherein the ATU message comprises the unique ID associated with each of the plurality of testbench components, an object handle to access the corresponding ATU, and an availability status of the corresponding ATU.

3. The method of claim 1, wherein selectively configuring the ATU associated with a testbench component of the one or more testbench components comprises:
    tracking, by the ATU, the set of activities corresponding to the testbench component;
    generating, by the ATU, the activity tracking report for the testbench component based on the associated set of activities performed by the testbench component in response to tracking, wherein the activity tracking report is generated at the end of the simulation; and
    sending, by the ATU, the activity tracking report generated for the testbench component to the activity tracker.

4. The method of claim 1, wherein the output of the set of activities comprises a number of packets processed by each of the plurality of testbench components, content within each of the number of packets, sequence of processing each of the number of packets, idle cycles associated with the number of packets, the number of packets processing frequency of each of the plurality of testbench components, a status information of each of the plurality of testbench components, and start time and end time associated with processing of each of the number of packets.

5. The method of claim 1, wherein the activity tracking report and the summarized activity report is one of a textual report, a graphical report, and a tabular report.

6. The method of claim 1, further comprises:
    utilizing, by the user, the activity tracking report, and the summarized activity report to perform at least one of:
        identifying one or more issues with respect to one or more of the set of activities performed by a corresponding testbench component of the one or more testbench components;
        evaluating performance of each of the one or more testbench components during the simulation; and
        comparing results of at least two simulations.

7. A system for generating an activity report for testbench components in a test environment, the system comprising:
    a processor; and
    a memory coupled to the processor, wherein the memory stores processor-executable instructions, which, on execution, causes the processor to:
        receive an Activity Tracking Unit (ATU) message from an ATU pre-installed within each of a plurality of testbench components;
        register each of the plurality of testbench components upon receiving the ATU message;
        retrieve a unique Identity (ID) associated with each of the plurality of registered testbench components present in the test environment, wherein the unique ID associated with each of the plurality of registered testbench components is transmitted by the corresponding ATU pre-installed in each of the plurality of registered testbench components;
        selectively configure the ATU associated with one or more testbench components from the plurality of registered testbench components to generate an activity tracking report at an end of a simulation, based on a user requirement, wherein the activity tracking report is generated based on an output of a set of activities performed by the one or more testbench components during the simulation;

fetch from the respective ATU, the activity tracking report corresponding to the one or more testbench components based on the associated unique ID;

generate a summarized activity report corresponding to the one or more testbench components based on the activity tracking report received from the respective ATU; and render at least one of the activity tracking report, and the summarized activity report generated corresponding to the one or more testbench components, to a user.

8. The system of claim 7, wherein the ATU message comprises the unique ID associated with each of the plurality of testbench components, an object handle to access the corresponding ATU, and an availability status of the corresponding ATU.

9. The system of claim 7, wherein, to selectively configure the ATU associated with a testbench component of the one or more testbench components, the processor-executable instructions further cause the processor to:

track, by the ATU, the set of activities corresponding to the testbench component;

generate, by the ATU, the activity tracking report for the testbench component based on the associated set of activities performed by the testbench component in response to tracking, wherein the activity tracking report is generated at the end of the simulation; and send, by the ATU, the activity tracking report generated for the testbench component to the activity tracker.

10. The system of claim 7, wherein the output of the set of activities comprises a number of packets processed by each of the plurality of testbench components, content within each of the number of packets, sequence of processing each of the number of packets, idle cycles associated with the number of packets, the number of packets processing frequency of each of the plurality of testbench components, a status information of each of the plurality of testbench components, and start time and end time associated with processing of each of the number of packets.

11. The system of claim 7, wherein the activity tracking report and the summarized activity report is one of a textual report, a graphical report, and a tabular report.

12. The system of claim 7, wherein the processor-executable instructions further cause the processor to:

utilize by the user, the activity tracking report, and the summarized activity report to perform at least one of:

identifying one or more issues with respect to one or more of the set of activities performed by a corresponding testbench component of the one or more testbench components;

evaluating performance of each of the one or more testbench components during the simulation; and comparing results of at least two simulations.

13. A non-transitory computer-readable storage medium having stored thereon, a set of computer-executable instructions causing a computer comprising one or more processors to perform steps comprising:

receiving, by an activity tracker, an Activity Tracking Unit (ATU) message from an ATU pre-installed within each of a plurality of testbench components;

registering, by the activity tracker, each of the plurality of testbench components upon receiving the ATU message;

retrieving, by the activity tracker, a unique Identity (ID) associated with each of the plurality of registered testbench components present in the test environment, wherein the unique ID associated with each of the plurality of registered testbench components is transmitted by the corresponding ATU pre-installed in each of the plurality of registered testbench components;

selectively configuring, by the activity tracker, the ATU associated with one or more testbench components from the plurality of registered testbench components to generate an activity tracking report at an end of a simulation, based on a user requirement, wherein the activity tracking report is generated based on an output of a set of activities performed by the one or more testbench components during the simulation;

fetching from the respective ATU, by the activity tracker, the activity tracking report corresponding to the one or more testbench components based on the associated unique ID;

generating, by the activity tracker, a summarized activity report corresponding to the one or more testbench components based on the activity tracking report received from the respective ATU; and rendering, by the activity tracker via a Graphical User Interface (GUI), at least one of the activity tracking report and the summarized activity report generated corresponding to the one or more testbench components, to a user.

\* \* \* \* \*